US009451275B2

(12) United States Patent
Haile et al.

(10) Patent No.: US 9,451,275 B2
(45) Date of Patent: Sep. 20, 2016

(54) SYSTEM AND METHOD FOR STORING AND MOVING GRAPHICAL IMAGE DATA SETS WITH REDUCED DATA SIZE REQUIREMENTS

(71) Applicant: LassoFX, Inc., Somerville, MA (US)

(72) Inventors: J. Mitchell Haile, Somerville, MA (US); Michael T. Rowan, Amesbury, MA (US)

(73) Assignee: LassoFX, Inc., Somerville, MA (US)

( * ) Notice: Subject to any disclaimer, the term of this patent is extended or adjusted under 35 U.S.C. 154(b) by 0 days.

(21) Appl. No.: 14/722,546

(22) Filed: May 27, 2015

(65) Prior Publication Data

US 2015/0350663 A1 Dec. 3, 2015

Related U.S. Application Data

(60) Provisional application No. 62/003,704, filed on May 28, 2014.

(51) Int. Cl.
| | |
|---|---|
| *G06K 9/36* | (2006.01) |
| *H04N 19/467* | (2014.01) |
| *H04N 19/176* | (2014.01) |
| *H04N 19/503* | (2014.01) |
| *H04N 19/46* | (2014.01) |
| *H04N 19/40* | (2014.01) |
| *H04N 19/60* | (2014.01) |

(52) U.S. Cl.
CPC .......... *H04N 19/467* (2014.11); *H04N 19/176* (2014.11); *H04N 19/40* (2014.11); *H04N 19/46* (2014.11); *H04N 19/503* (2014.11); *H04N 19/60* (2014.11)

(58) Field of Classification Search
USPC ......... 382/233, 232, 249, 124; 708/400, 401
See application file for complete search history.

(56) References Cited

U.S. PATENT DOCUMENTS

| | | | | |
|---|---|---|---|---|
| 6,675,185 | B1 * | 1/2004 | Mitchell | G06F 17/147 708/400 |
| 8,045,810 | B2 * | 10/2011 | Wu | G06F 17/147 382/232 |
| 8,437,560 | B2 * | 5/2013 | Wu | G06F 17/147 382/232 |
| 8,737,752 | B2 * | 5/2014 | Wu | G06F 17/147 382/233 |

* cited by examiner

*Primary Examiner* — Anh Do (57) ABSTRACT

A method for reducing data size of digital images is provided. The method includes receiving a Joint Photographic Experts Group (JPEG) encoded image, and performing an entropy decode on the image. The method also includes generating a fingerprint for each JPEG coefficient block, and processing the fingerprints to determine the identity of any duplicate or similar JPEG coefficient blocks. The method further includes generating metadata identifying the duplicate or similar JPEG coefficient blocks, and compressing non-duplicate and/or non-similar JPEG coefficient blocks. The method also includes transferring the metadata and the non-duplicate and/or non-similar JPEG coefficient blocks to a remote system.

3 Claims, 14 Drawing Sheets

SYSTEM AND METHOD FOR STORING AND MOVING GRAPHICAL IMAGE DATA SETS WITH REDUCED DATA SIZE REQUIREMENTS

RELATED APPLICATIONS

This application hereby claims the benefit of and priority to U.S. Provisional Patent Application No. 62/003,704, titled "System and Method for Storing and Moving Graphical Image Data Sets With Reduced Data Size Requirements", filed on May 28, 2014 and which is hereby incorporated by reference in its entirety.

TECHNICAL BACKGROUND

Easy to use digital image capture devices have enabled the public to capture an incredible quantity of digital images each day. People can be seen everywhere taking photos with their cell phones for uploading to any of a variety of social media web sites. However, most cell phone contracts include limits on the quantity of data that may be downloaded or uploaded each month. Also, for many devices, upload speeds tend to be significantly slower than download speeds.

As time progresses, the resolution of many image capture devices increases, and upload times remain significantly long. Likewise, while storage devices such as hard disks, memory, solid state drives, and the like increase in size, the quantity of digital data that users wish to store also increases in size and quantity.

OVERVIEW

In an embodiment, a method for reducing data size of digital images is provided. The method includes receiving a Joint Photographic Experts Group (JPEG) encoded image, and performing an entropy decode on the image. The method also includes generating a fingerprint for each JPEG coefficient block, and processing the fingerprints to determine the identity of any duplicate or similar JPEG coefficient blocks. The method further includes generating metadata identifying the duplicate or similar JPEG coefficient blocks, and compressing non-duplicate and/or non-similar JPEG coefficient blocks. The method also includes transferring the metadata and the non-duplicate and/or non-similar JPEG coefficient blocks to a remote system.

In one embodiment of the invention, a computer storage system is used to store data of various types. When a non-graphical file is stored into the storage system, the file is simply passed straight to disk or a RAID group without further processing. When a graphical file in a supported format is stored into the storage system, it is stored using the data size reduction techniques described below.

While this invention focuses on JPEG images, which have a specified method for compression and data arrangement that enable certain techniques to be applied to them for further activity that can reduce their storage overhead on the underlying storage system, or move them more efficiently across a network, this invention is also applicable to other types and formats of digital data including files that contain JPEG and/or graphical content such as the outputs of word processing programs, presentation programs, document formatting programs, and the like.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Many techniques exist today to compress graphical images, be they photos or other types of graphics. Applications that work with graphical data sets often operate with a plurality of images, which can be stored as individual files or other ways to group separate images together. Most techniques for compressing images focus on how to make one image as small as possible without considering additional images that might be related or contain similar data. By considering similar subsets of data across multiple images, these images can be stored more efficiently and moved across networks and the Internet with more efficiency, which is particularly interesting for large sets of graphical images or slow networks, such as mobile networks and devices.

Figure 1:
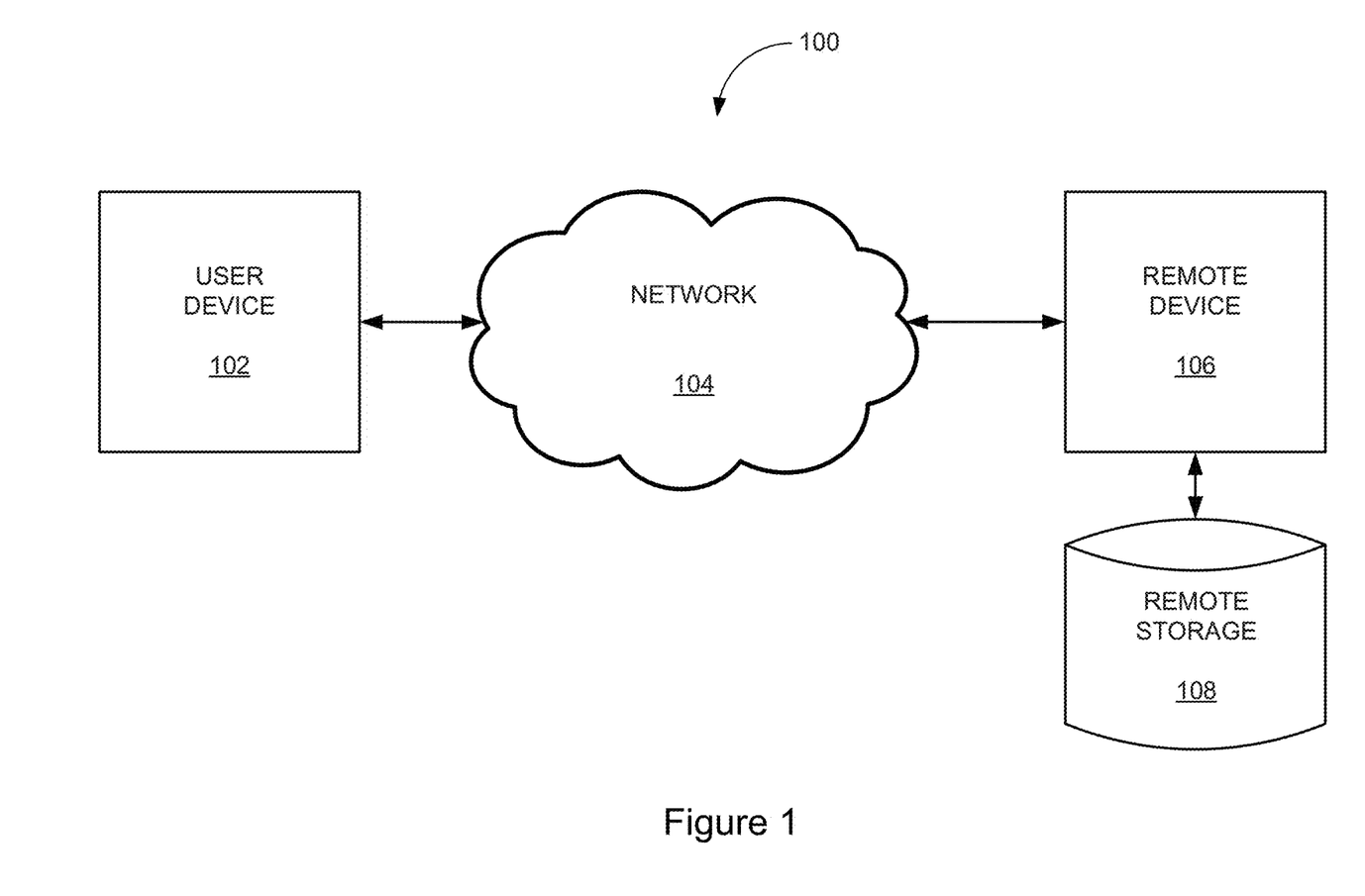
FIG. 1 illustrates a block diagram of a system for storing and moving graphical image data sets with reduced data size requirements.

FIG. 1 illustrates a block diagram of a system 100 for storing and moving graphical image data sets with reduced data size requirements. In this example, user device 102 uploads digital images to remote device 106 for storage in remote storage 108 through network 104. Network 104 is any network capable of transferring data between user device 102 and remote device 106, such as a local area network (LAN), wide area network (WAN), the Internet, and the like. Network 104 may include both wired and wireless elements including such elements as a cell phone network, local wireless network, and the like.

In this example, user device 102 receives or creates a digital image stored in the Joint Photographic Experts Group (JPEG) format. User device 102 performs an entropy decode on the image, which reverses the entropy encode done on the data as a step in the JPEG formatting process. This results in a plurality of JPEG coefficient blocks. User device 102 then generates a fingerprint for each of the JPEG coefficient blocks. Fingerprints may be created using a hashing function or other similar methods.

At this point user device 102 has fingerprints for each of the JPEG coefficient blocks. In this example, the upload speed between user device 102 and remote device 106 is slow and expensive and the user desires to minimize the quantity of data uploaded to remote device 106. User device uploads the set of fingerprints (which are significantly smaller than their corresponding digital image data) to remote device 106.

In this example, remote device 106 is a cloud storage device which has a very large quantity of digital images stored in remote storage 108. Previously, remote device 106 has processed at least some of the images stored in remote storage 108 and generated fingerprint sets for each of the processed images. These fingerprint sets are also stored in remote storage 108. When remote device 106 receives the set of fingerprints from user device 102, it compares each of the fingerprints with the fingerprint sets stored in remote storage 108 to determine which blocks are duplicates of and/or similar to blocks already stored in remote storage 108.

Remote device 106 then identifies the blocks that are non-duplicates and/or non-similar and communicates these identities back to user device 102. These are the only image blocks that need to be uploaded to remote device 106, since the other image blocks (or similar image blocks) are already stored in remote storage 108.

User device 102 processes this list of blocks to generate metadata containing the identities of the image blocks that are already stored in remote storage 108 and where they are placed within the image that user device 102 is uploading to remote device 106. User device 102 then compresses the unique blocks that need to be uploaded, and transfers the metadata and unique blocks to remote device 106.

At this point, remote device 106 has all the unique blocks that need to be stored in remote storage 108 along with metadata identifying image blocks already stored in remote storage 108 that are needed to re-construct the original image. Remote device 106 may then assemble the unique image blocks from user device 102 with the duplicate and/or similar image blocks from remote storage 108 described within the metadata to re-construct the original JPEG image.

Remote device 106 then stores the JPEG image in remote storage 108 and updates its fingerprint sets with the fingerprints of the unique blocks within the new JPEG image. Other embodiments may store the fingerprints of all of the blocks within the new JPEG image is storage space on remote storage 108 is not at a premium.

In another embodiment, where storage space on remote storage 108 is at a premium, remote device may simply store the metadata and unique blocks from the new image in remote storage 108 and only re-construct the full JPEG image when it is requested from remote storage 108.

Those of skill in the art will recognize that various steps in the method described above may be performed in either user device 102 or remote device 106 depending on whether the user needs to save bandwidth or storage space. In one embodiment, all of the method steps are performed within user device 102 to reduce the amount of internal storage required to store a plurality of JPEG images. FIGS. 2-5 illustrate some examples of the different ways these method steps may be performed by various devices depending on whether the goal of the user is to reduce upload times or to reduce storage requirements, or both.

Figure 2:
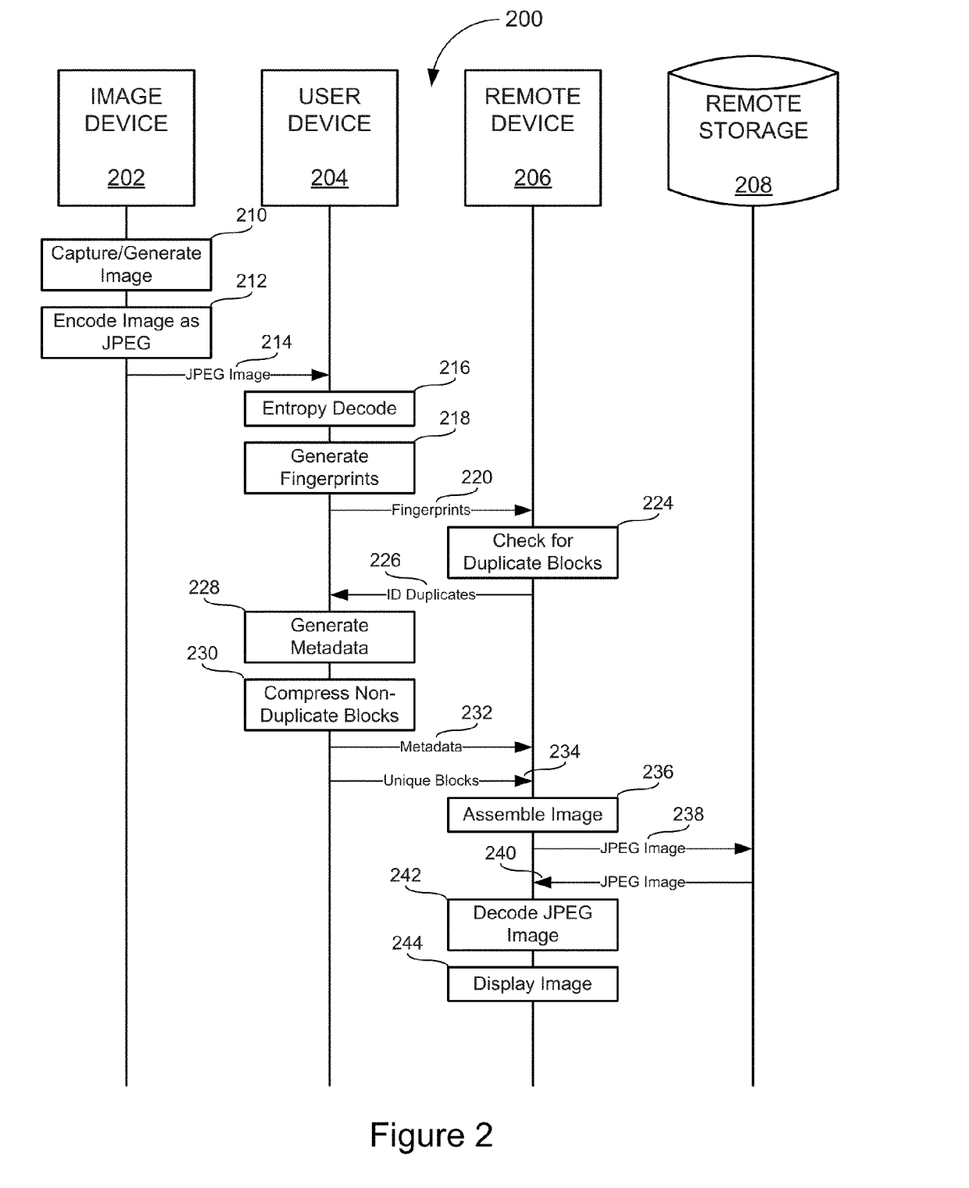
FIG. 2 illustrates a method flow diagram of a system for storing and moving graphical image data sets with reduced data size requirements.

FIG. 2 illustrates a method flow diagram 200 of a system for storing and moving graphical image data sets with reduced data size requirements. In this example, image device 202 captures or generates an image, (operation 210), and encodes the image in the JPEG format, (operation 212). Image device 202 transfers the JPEG image to user device 204, (operation 214).

User device 204 performs an entropy decode on the JPEG image, (operation 216), and generates fingerprints for each of the JPEG coefficient blocks, (operation 218). User device 204 transfers the set of fingerprints to remote device 206, (operation 220).

Remote device 206 compares each of the new fingerprints to a set of fingerprints stored in remote storage 208 to determine duplicate and/or similar blocks, (operation 224). Remote device 206 then transfers the identity of the duplicate and/or similar blocks to user device 204, (operation 226). In other embodiments, remote device 206 transfers the identity of the unique blocks to user device 204. Either way, remote device 206 communicates to user device 204 which blocks need to be uploaded.

User device 204 then generates metadata which includes the identity of the duplicate and/or similar blocks and their locations in the image, (operation 228). User device also compresses the non-duplicate and non-similar blocks, (operation 230) and transfers the metadata (operation 232) and the compressed unique blocks (operation 234) to remote device 206.

In this example embodiment, remote device 206 processes the metadata, unique blocks, and duplicate/similar blocks to assemble the image back into the JPEG format, (operation 236). Remote device 206 transfers the JPEG image to remote storage 208 for storage, (operation 238).

When remote device 206 is tasked with displaying the image, it retrieves the JPEG image from remote storage 208, (operation 240), decodes the JPEG image, (operation 242), and displays the image, (operation 244).

Figure 3:
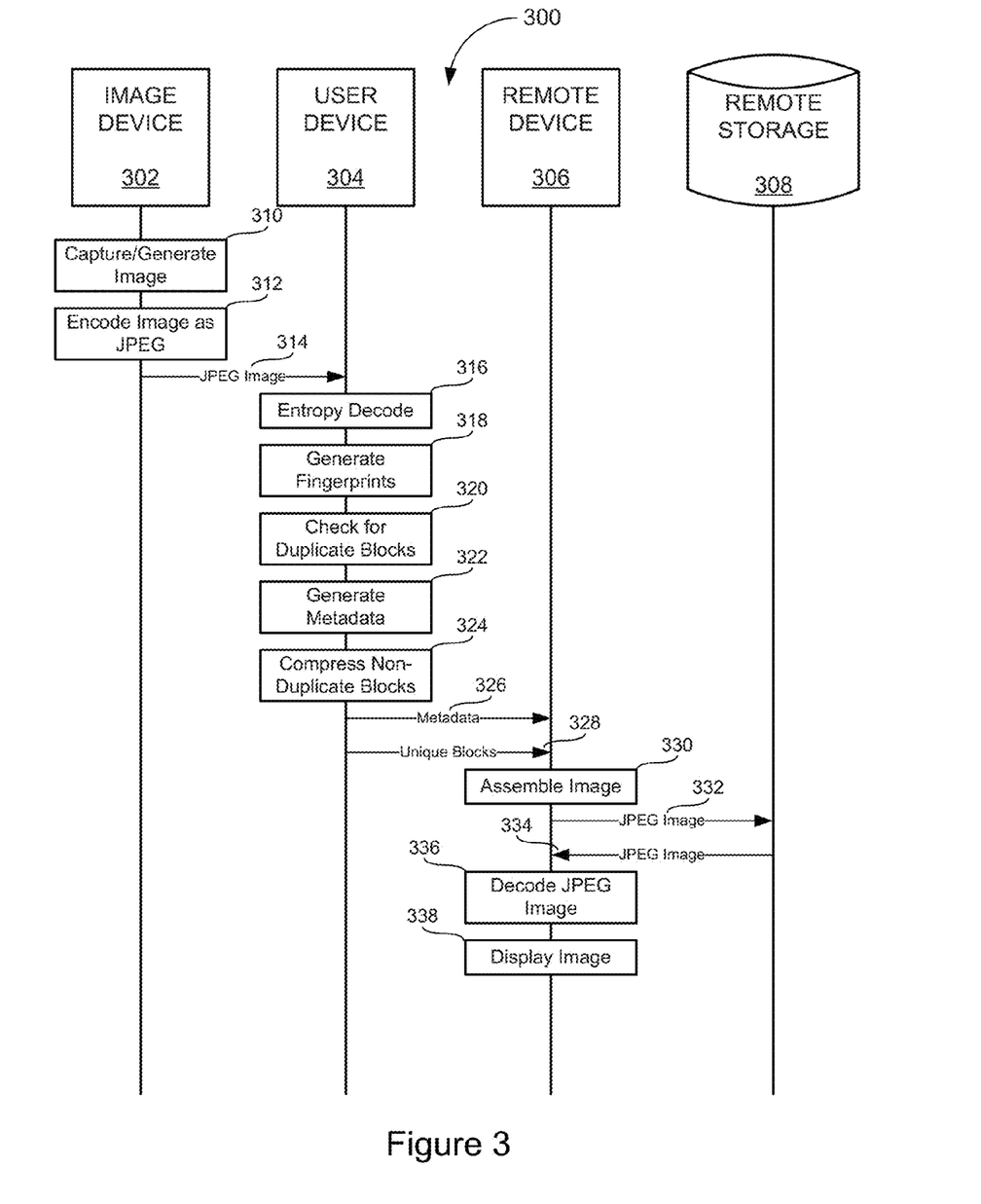
FIG. 3 illustrates a method flow diagram of a system for storing and moving graphical image data sets with reduced data size requirements.

FIG. 3 illustrates a method flow diagram 300 of a system for storing and moving graphical image data sets with reduced data size requirements. In this example embodiment, user device 304 includes one or more image in local storage, and has a fingerprint database also stored in local storage containing sets of fingerprints for the one or more image.

In this example embodiment, image device 302 captures or generates an image, (operation 310), and encodes the image in the JPEG format, (operation 312). Image device 302 transfers the JPEG image to user device 304, (operation 314).

User device 304 performs an entropy decode on the JPEG image, (operation 316), and generates fingerprints for each of the JPEG coefficient blocks, (operation 318). User device 304 compares each of the fingerprints to determine which blocks are duplicates of and/or similar to other blocks within the image and within any other images stored internally, (operation 320).

User device 304 then generates metadata which includes the identity of the duplicate and/or similar blocks and their locations in the image, (operation 322). User device 304 also compresses the non-duplicate and non-similar blocks, (operation 324) and transfers the metadata (operation 326) and the compressed unique blocks (operation 328) to remote device 306.

In this example embodiment, remote device 306 processes the metadata, unique blocks, and duplicate/similar blocks to assemble the image back into the JPEG format, (operation 330). Remote device 306 transfers the JPEG image to remote storage 308 for storage, (operation 332).

When remote device 306 is tasked with displaying the image, it retrieves the JPEG image from remote storage 308, (operation 334), decodes the JPEG image, (operation 336), and displays the image, (operation 338).

Figure 4:
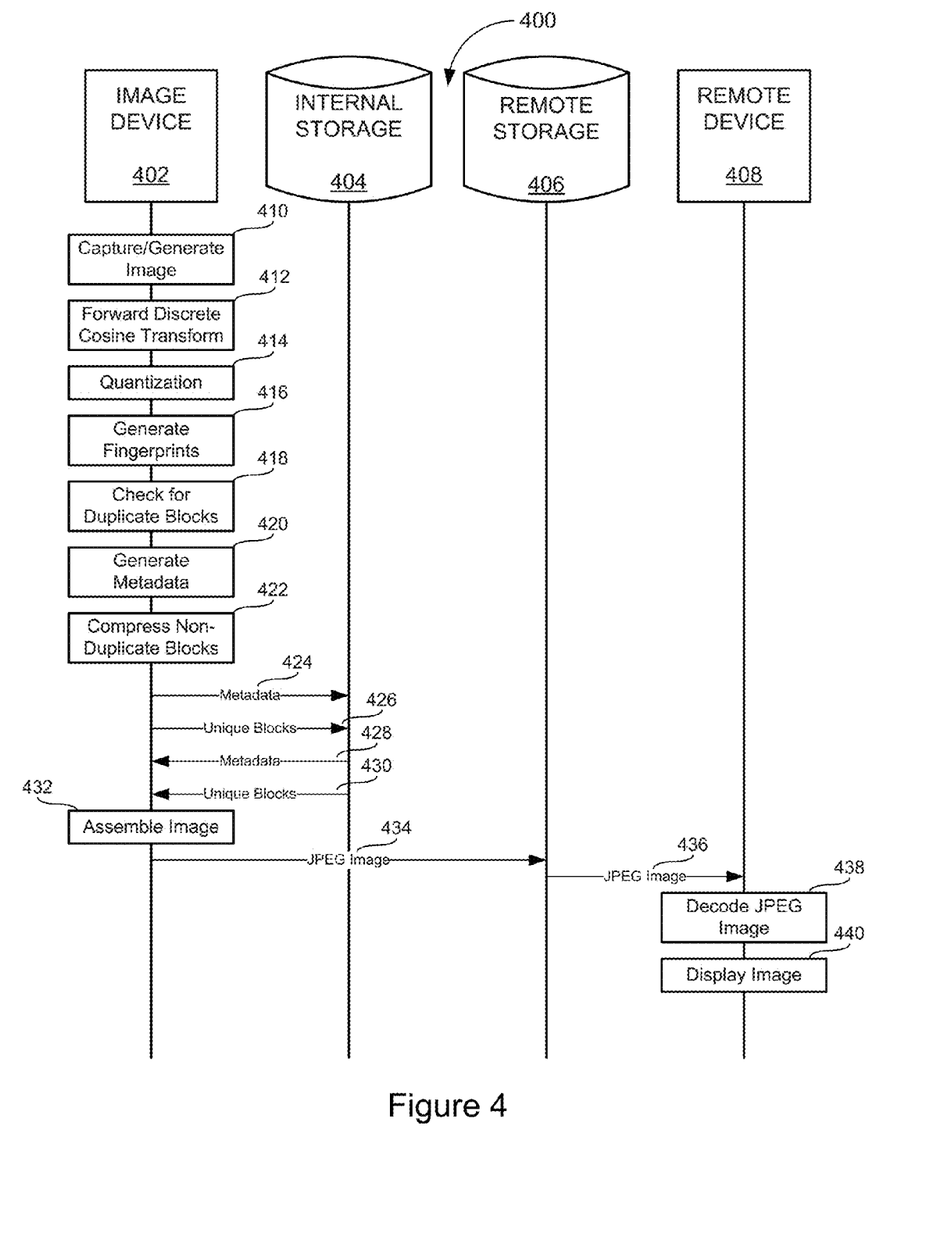
FIG. 4 illustrates a method flow diagram of a system for storing and moving graphical image data sets with reduced data size requirements.

FIG. 4 illustrates a method flow diagram 400 of a system for storing and moving graphical image data sets with reduced data size requirements. In this example embodiment, the method is performed solely within image device 402 in order to maximize the use of internal storage 404.

In this example, image device 402 is a digital camera including internal storage 404 such as a memory card. Many photographers take a plurality of similar photos at a single location in order to try to capture a particular moment. Also, photographers often take a series of photos across a scene for later assembly into a panoramic photo. In each of these cases, internal storage 404 will include a large number of photos that are very similar and often contain identical blocks of image data.

Here, image device 402 captures or generates a digital image, (operation 410), and begins the process of encoding the image into a JPEG format. Image device 402 divides the image into a plurality of blocks (typically of 64 pixels) and performs forward discrete cosine transforms on each of the blocks, (operation 412). Image device 402 also performs the standard JPEG quantization on each of the blocks, (operation 414), and generates fingerprints for each of the resulting JPEG coefficient blocks, (operation 416).

Image device 402 compares each of the fingerprints to determine which blocks are duplicates of and/or similar to other blocks within the image and within any other images stored in internal storage 404, (operation 418).

Image device 402 then generates metadata which includes the identity of the duplicate and/or similar blocks and their locations in the image, (operation 420). Image device 402 also compresses the non-duplicate and non-similar blocks, (operation 422) and transfers the metadata (operation 424) and the compressed unique blocks (operation 426) to internal storage 404.

In this example embodiment, when a user desires to transfer images from image device 402 to remote device 404 for display, image device 402 retrieves the metadata (operation 428) and the unique blocks (operation 430) from internal storage 404. Image device 402 then processes the metadata, unique blocks, and duplicate/similar blocks to assemble the image back into the JPEG format, (operation 432). Image device 402 transfers the JPEG image to remote storage 406 for storage, (operation 434).

When remote device 408 is tasked with displaying the image, it retrieves the JPEG image from remote storage 406, (operation 436), decodes the JPEG image, (operation 438), and displays the image, (operation 440).

Figure 5:
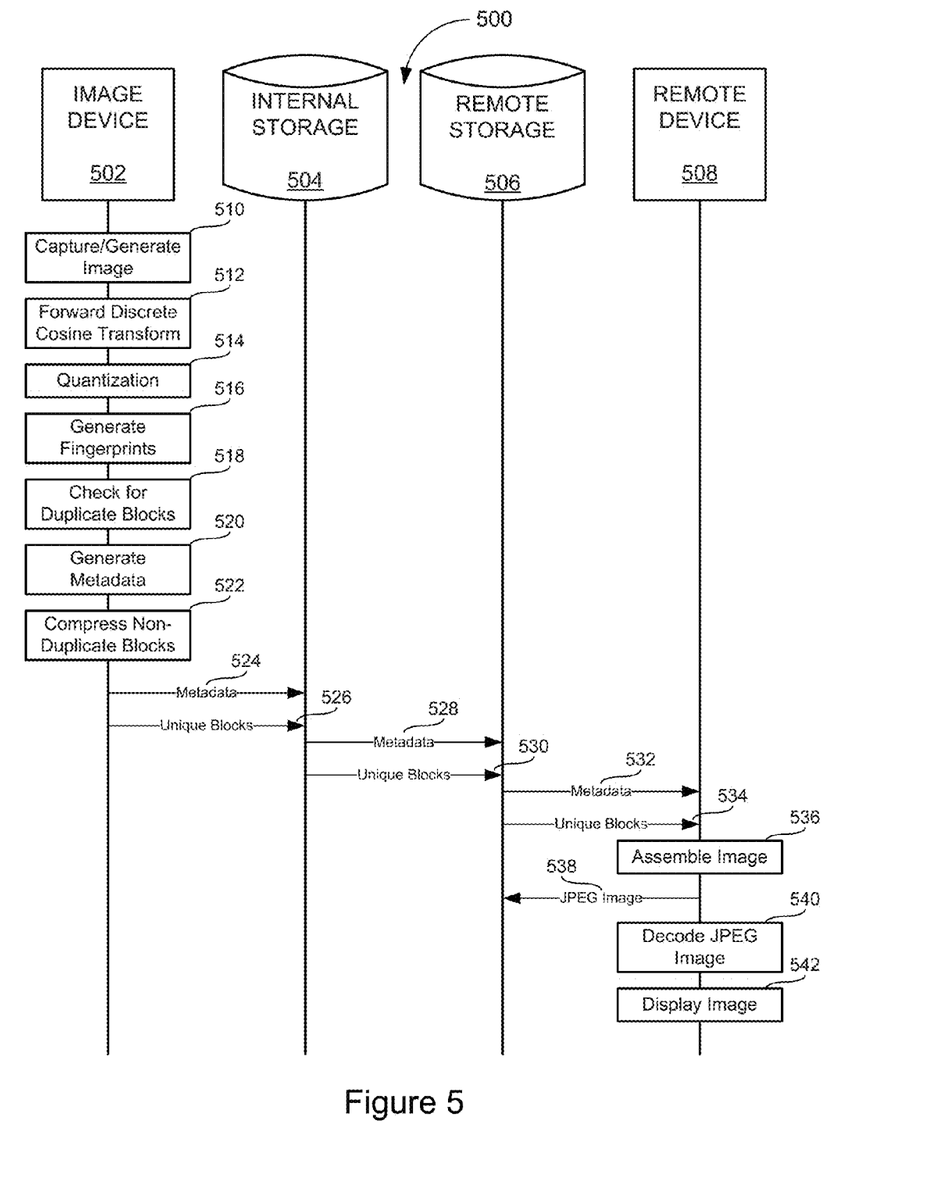
FIG. 5 illustrates a method flow diagram of a system for storing and moving graphical image data sets with reduced data size requirements.

FIG. 5 illustrates a method flow diagram 500 of a system for storing and moving graphical image data sets with reduced data size requirements. In this example embodiment, the method is performed mostly within image device 502 in order to maximize the use of internal storage 504, remote storage 506, and to shorten upload times.

In this example, image device 502 is a digital camera including internal storage 504 such as a memory card. As discussed above, many photographers take a plurality of similar photos at a single location in order to try to capture a particular moment. Also, photographers often take a series of photos across a scene for later assembly into a panoramic photo. In each of these cases, internal storage 504 will include a large number of photos that are very similar and often contain identical blocks of image data.

Here, image device 502 captures or generates a digital image, (operation 510), and begins the process of encoding the image into a JPEG format. Image device 502 divides the image into a plurality of blocks (typically of 64 pixels) and performs forward discrete cosine transforms on each of the blocks, (operation 512). Image device 502 also performs the standard JPEG quantization on each of the blocks, (operation 514), and generates fingerprints for each of the resulting JPEG coefficient blocks, (operation 516).

Image device 502 compares each of the fingerprints to determine which blocks are duplicates of and/or similar to other blocks within the image and within any other images stored in internal storage 504, (operation 518).

Image device 502 then generates metadata which includes the identity of the duplicate and/or similar blocks and their locations in the image, (operation 520). Image device 502 also compresses the non-duplicate and non-similar blocks, (operation 522) and transfers the metadata (operation 524) and the compressed unique blocks (operation 526) to internal storage 504.

In this example embodiment, when a user desires to transfer images from image device 502's internal storage 504 to remote storage 506 for further storage, and to remote device 504 for display, internal storage 504 (often by way of image device 502) transfers the metadata (operation 528) and the unique blocks (operation 530) to remote storage.

Remote device 508 retrieves the metadata (operation 532) and the unique blocks (operation 534) from remote storage 506. Remote device 508 then processes the metadata, unique blocks, and duplicate/similar blocks to assemble the image back into the JPEG format, (operation 540), and displays the image, (operation 542).

Figure 6:
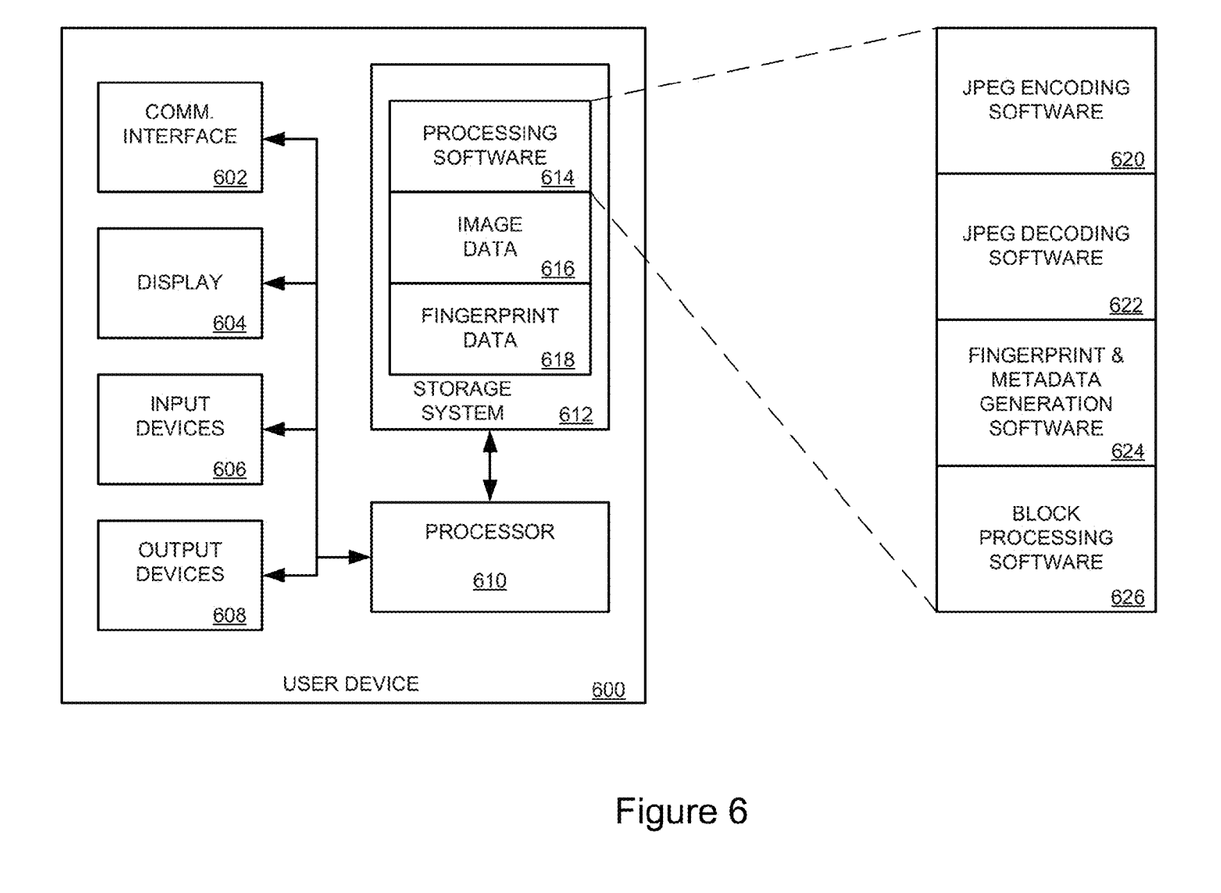
FIG. 6 illustrates a block diagram of an example user device for use within a system for storing and moving graphical image data sets with reduced data size requirements.

FIG. 6 illustrates a block diagram of an example user device 600 for use within a system for storing and moving graphical image data sets with reduced data size requirements.

The methods illustrated in FIGS. 2-5 are implemented on one or more user device 600, as shown in FIG. 6. User device 600 includes communication interface 602, display 604, input devices 606, output devices 608, processor 610, and storage system 612. Processor 610 is linked to communication interface 602, display 604, input devices 606, output devices 608, and storage system 612. Storage system 612 includes a non-transitory memory device that stores processing software 614, image data 616, and fingerprint data 618.

Communication interface 602 includes components that communicate over communication links, such as network cards, ports, RF transceivers, processing circuitry and software, or some other communication devices. Communication interface 602 may be configured to communicate over metallic, wireless, or optical links Communication interface

602 may be configured to use TDM, IP, Ethernet, optical networking, wireless protocols, communication signaling, or some other communication format—including combinations thereof.

Display 604 may be any type of display capable of presenting information to a user. Displays may include touch screens in some embodiments. Input devices 606 include any device capable of capturing or generating digital images and transferring them to user device 600. Input devices 606 may include a camera, keyboard, mouse, touch pad, or some other user input apparatus. Output devices 608 include any device capable of transferring outputs from user device 600 to a network or other device. Output devices 408 may include printers, projectors, displays, or some other user output apparatus. Display 604, input devices 606, and output devices 608 may be external to user device 600 or omitted in some examples.

Processor 610 includes a microprocessor and other circuitry that retrieves and executes processing software 614 from storage system 612. Storage system 612 includes a disk drive, flash drive, data storage circuitry, or some other non-transitory memory apparatus. Processing software 614 includes computer programs, firmware, or some other form of machine-readable processing instructions. Processing software 614 may include an operating system, utilities, drivers, network interfaces, applications, or some other type of software. When executed by processing circuitry, processing software 614 directs processor 610 to operate user device 600 according to the methods illustrated in FIGS. 2-5.

In this example, processing software 614 includes JPEG encoding software 620, JPEG decoding software 622, fingerprint and metadata generation software 624, and block processing software 626 which direct processor 610 to operate according to the methods illustrated in FIGS. 2-5.

In this example, user device 600 executes a number of methods stored as processing software 614 within storage system 612. The results of these methods are displayed to a user via display 604, output devices 608, or transferred to external devices via communication interface 602. Input devices 606 allow one or more devices to send image data to user device 600.

For example, processor 610 receives a JPEG image either from communication interface 602 or input devices 606. Processor 610 then operates on the image data to reduce the size of the image data for transfer or storage.

Figure 7:
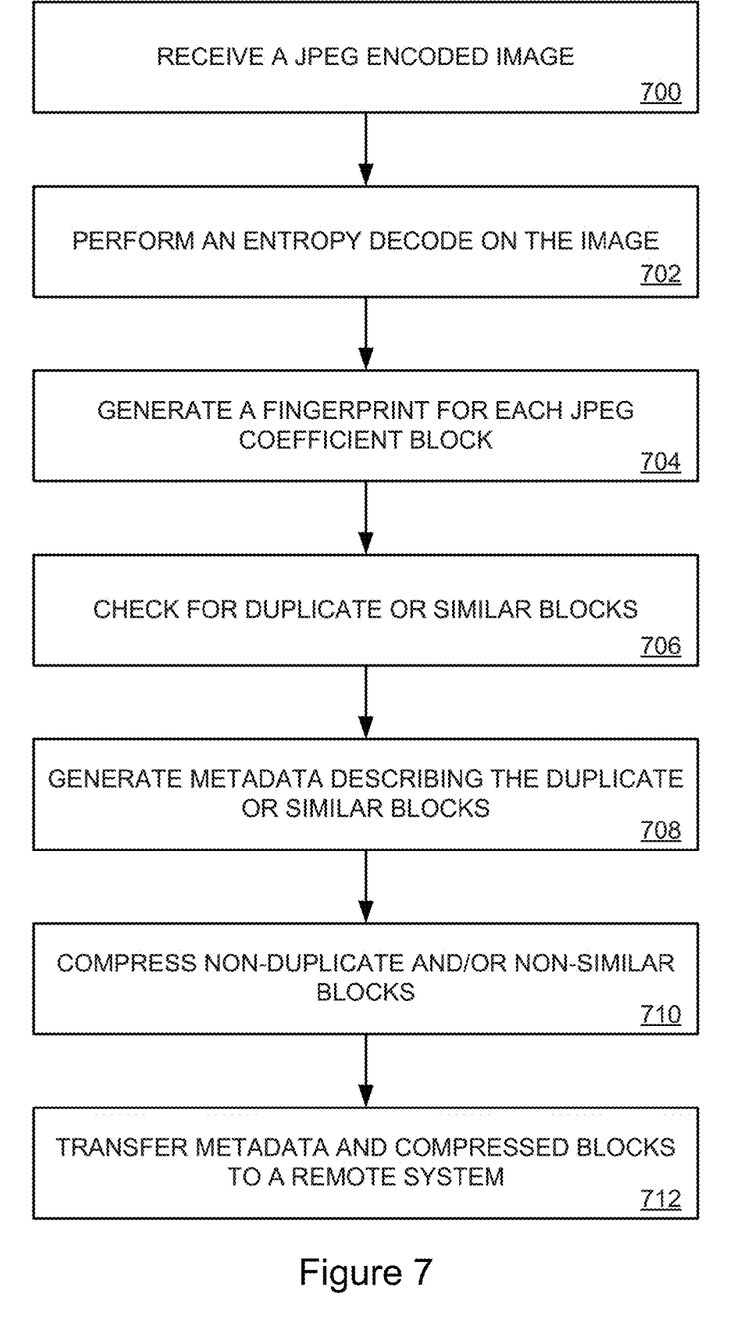
FIG. 7 illustrates a flow chart of a method for storing and moving graphical image data sets with reduced data size requirements.

FIG. 7 illustrates a flow chart of a method for storing and moving graphical image data sets with reduced data size requirements. Referring to the system illustrated in FIG. 1, user device 102 receives a JPEG encoded image, (operation 700). User device 102 performs an entropy decode on the image, (operation 702).

User device 102 then generates a fingerprint for each JPEG coefficient block, (operation 104), and transfers the fingerprints to remote device 106 through network 104. Remote device 106 checks a fingerprint database in remote storage 108 for duplicate and/or similar blocks, (operation 706), and communicates the identities of the duplicate and/or similar blocks to user device 102.

User device 102 generates metadata describing the duplicate and/or similar blocks, such as their identity and location within the image, (operation 708). User device 102 compresses the non-duplicate and/or non-similar blocks, (operation 710). User device 102 then transfers the metadata and compressed blocks to remote device 106, (operation 712).

Figure 8:
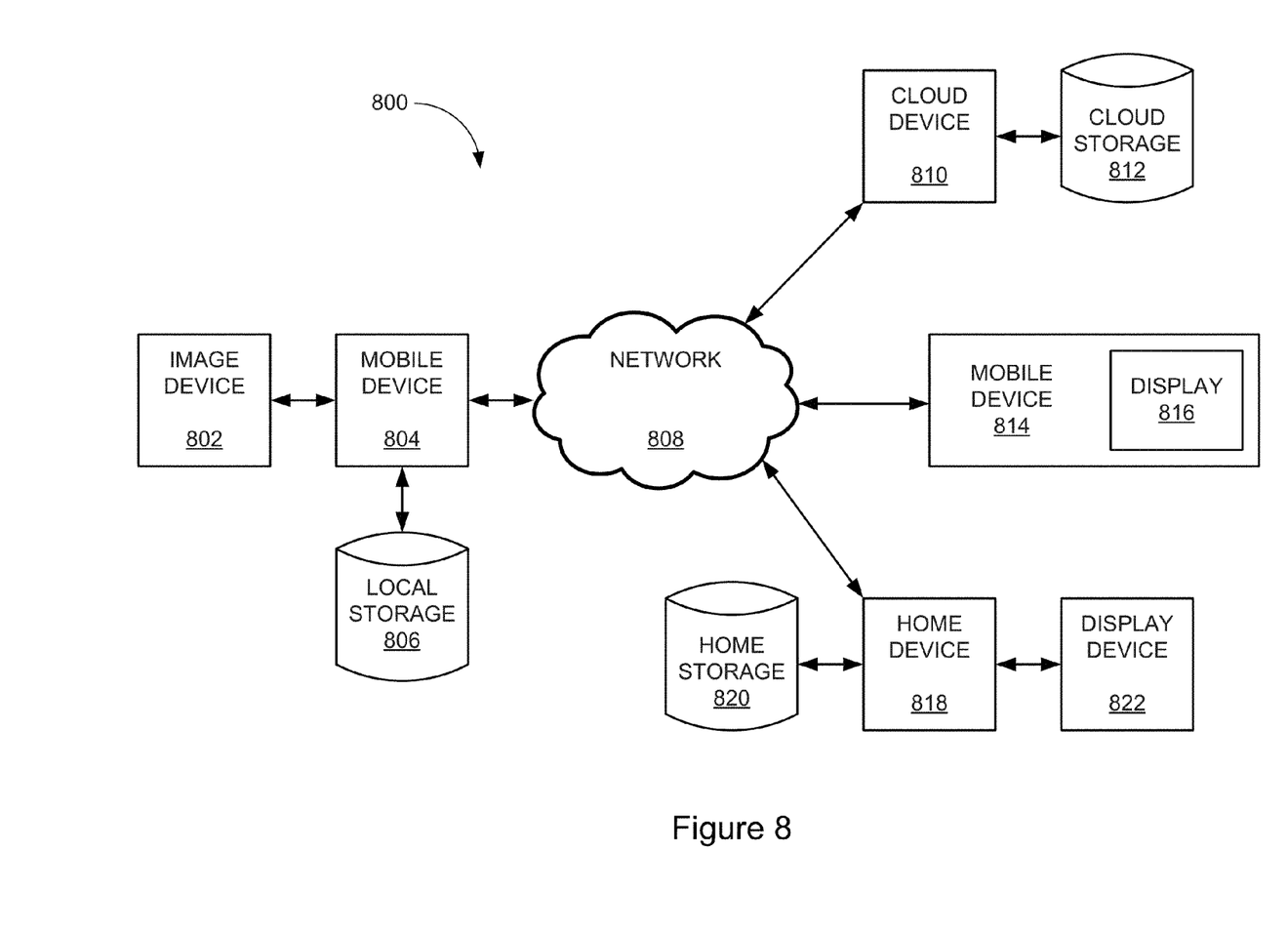
FIG. 8 illustrates a block diagram of a system for storing and moving graphical image data sets with reduced data size requirements.

FIG. 8 illustrates a block diagram of a system 800 for storing and moving graphical image data sets with reduced data size requirements. In this example embodiment, mobile device 804 receives a JPEG image from image device 802, and stores the image in local storage 806. If storage space within local storage 806 is at a premium, mobile device 804 performs the method illustrated in FIG. 4 and stores only metadata and compressed blocks in local storage 806.

A user may desire to upload the image to various different applications. Where upload bandwidth is at a premium, mobile device 804 may perform the method illustrated in FIG. 2 to work in partnership with the various applications to upload only the metadata and compressed unique blocks to the application, where the original JPEG image may then be recreated.

For example, a user may wish to store image data in cloud storage 812 through network 808 and cloud device 810. In this example, mobile device 804 sends fingerprints cloud device 810 which then determines which blocks are duplicated within cloud storage 812, and receives only metadata and the unique blocks from mobile device 804.

If the user wishes to display the image on a different mobile device, such as mobile device 814, mobile device 804 and mobile device 814 may use the method illustrated in FIG. 2 such that only metadata and compressed unique blocks need to be transferred to mobile device 814 through network 808 for display on display 816.

In another example, the user may wish to transfer one or more image from mobile device 804 to home device 818 through network 808 for display on display device 822 and storage in home storage 820. In this case mobile device 804 and home device 818 may use the method illustrated in FIG. 2 such that only metadata and compressed unique blocks need to be transferred to home device 818.

FIGS. 9A-9F illustrate example images processed to determine JPEG coefficient blocks that are duplicates of or similar to other JPEG coefficient blocks within the images.

Figure 9A:
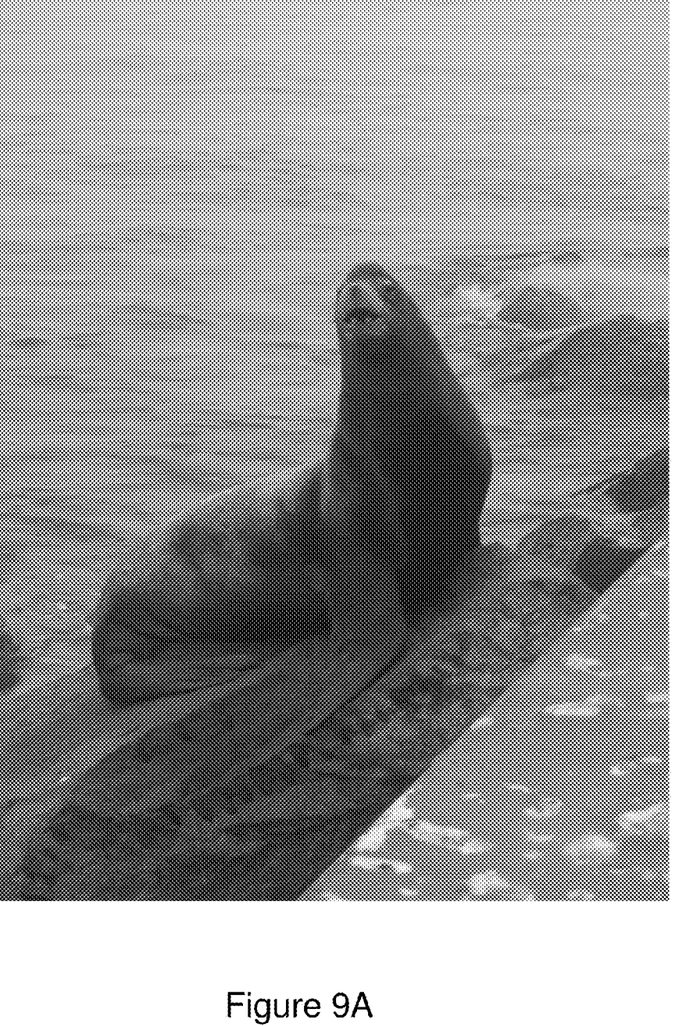
FIGS. 9A-9F illustrate example images processed to determine JPEG coefficient blocks that are duplicates of or similar to other JPEG coefficient blocks within the images.

FIG. 9A is an example photograph of a sea lion. FIG. 9D is an example photograph of Las Vegas. These two photographs are used as an example photo database. Where an actual photo database would contain many more images, for this example, just these two images are processed using the method illustrated in FIG. 2. Unique blocks are image blocks that are not duplicated in either of the two images. Duplicated blocks are those for which an identical block exists in either of the two images. While these photographs are illustrated in black and white, color photos are also amenable to this process.

Figure 9B:
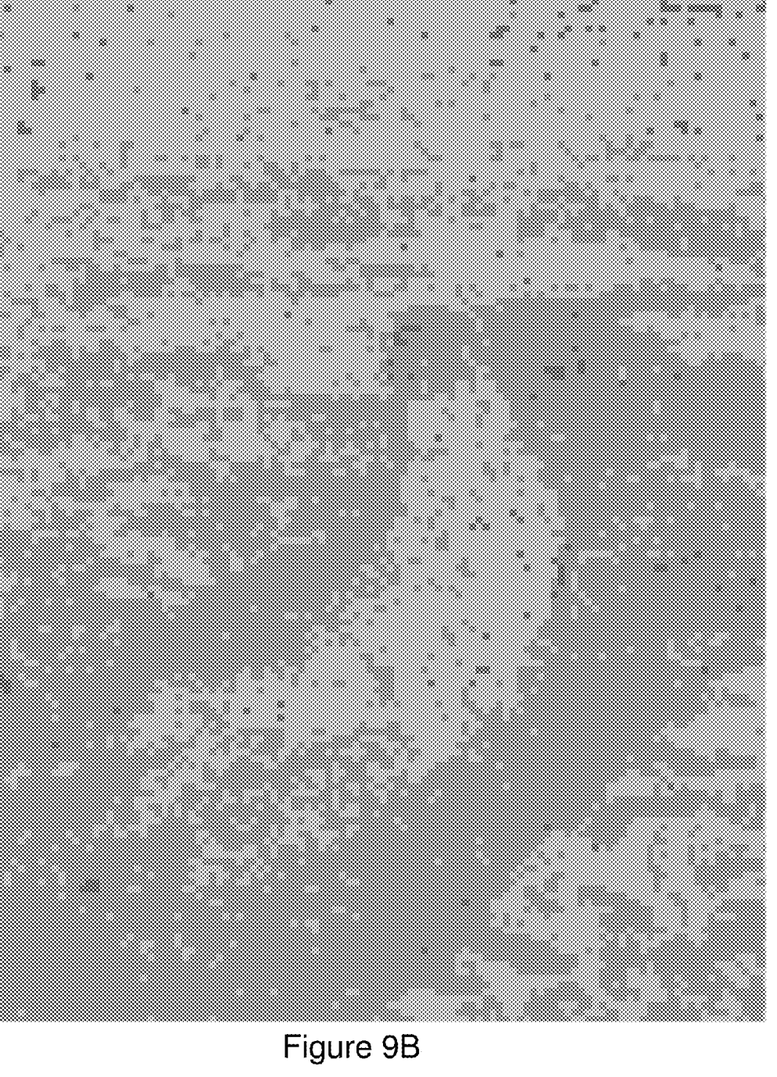
Figure 9C:
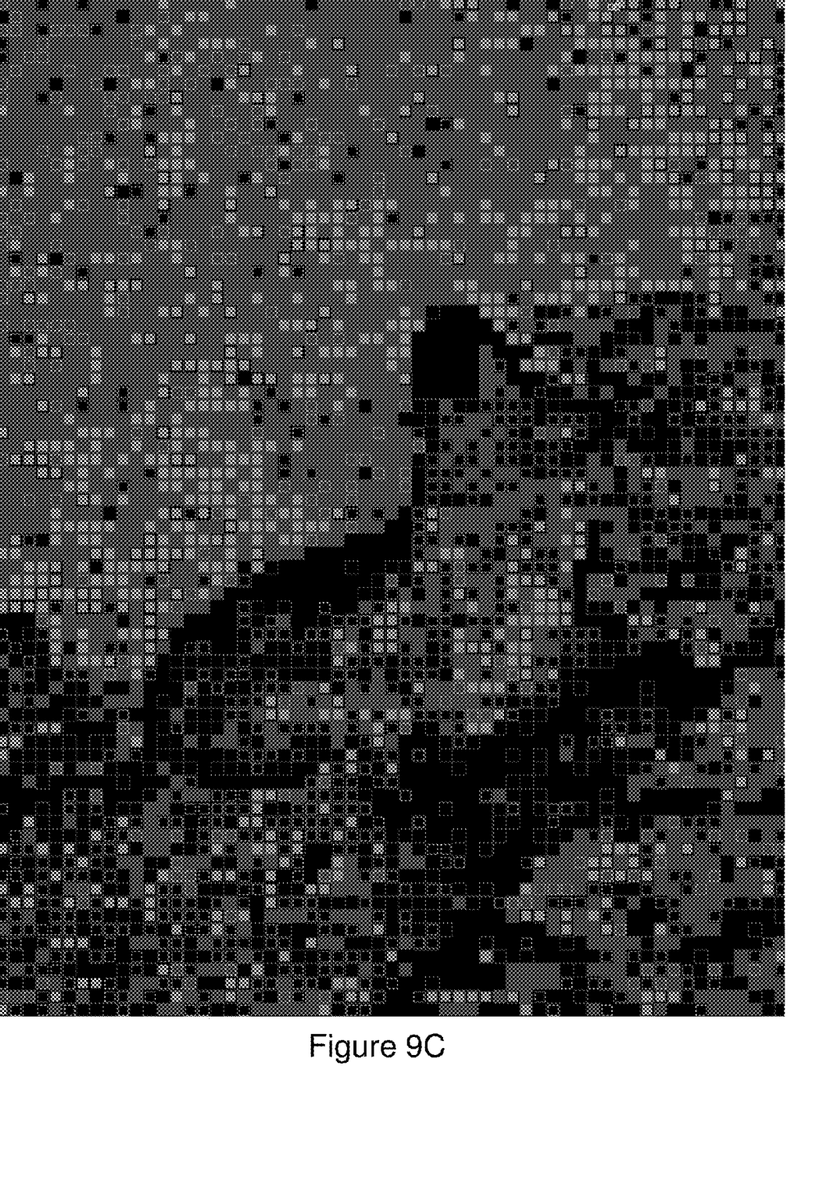
Figure 9D:
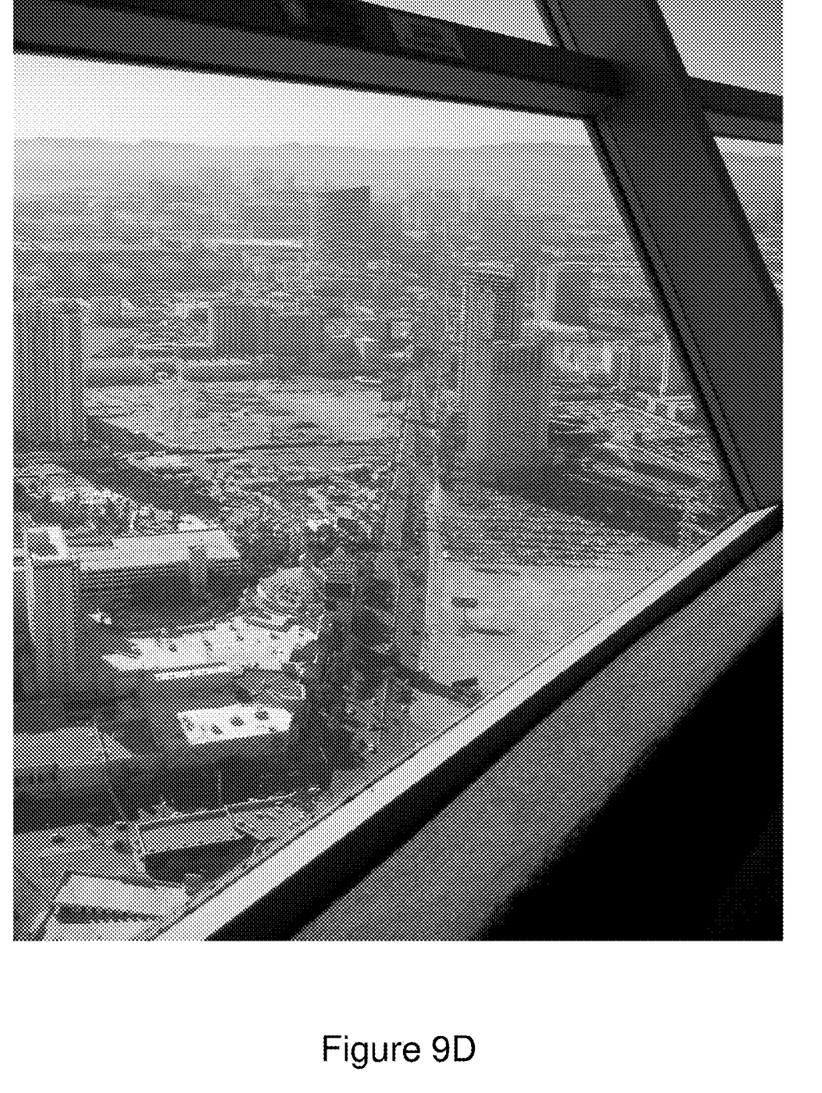
Figure 9E:
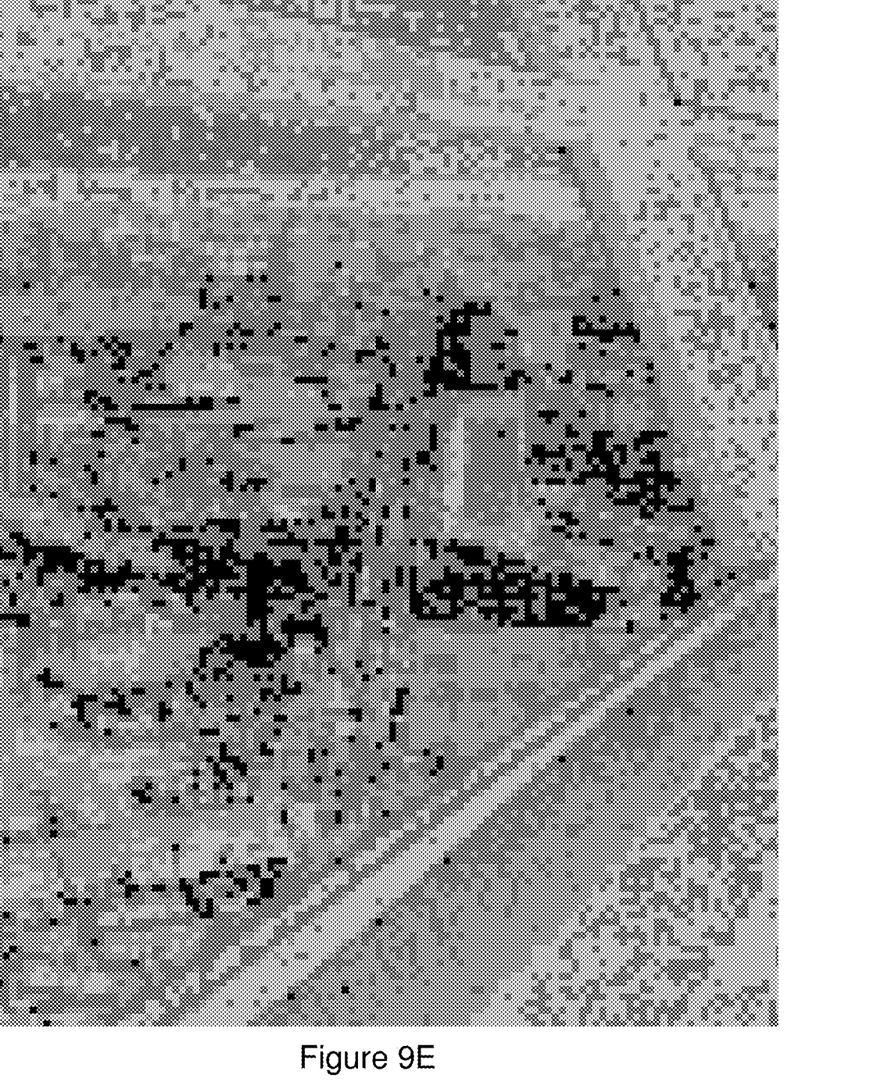

FIG. 9B is an illustration of processing the image blocks from the sea lion photo to determine which blocks are unique and which blocks are duplicated, while FIG. 9E is an illustration of processing the image blocks from the Las Vegas photo to determine which blocks are unique and which blocks are duplicated. FIGS. 9B and 9E illustrate similarity calculations within the luminance channel based on near-neighbors within the images. In this example, black blocks indicate unique image blocks, while blocks with similar neighbors are various shades of gray. The different shades of gray illustrate how similar or dissimilar the represented luminance channel is from a nearby neighbor. This similarity is determined by searching a variety of neighbors and selecting the neighbor with the lowest rank. By definition, each matrix is no more than 64 transformation operations away from any other matrix, so a very high rank, such as 48, is not useful, but a low rank of 1-4 may be quite useful.

Figure 9F:
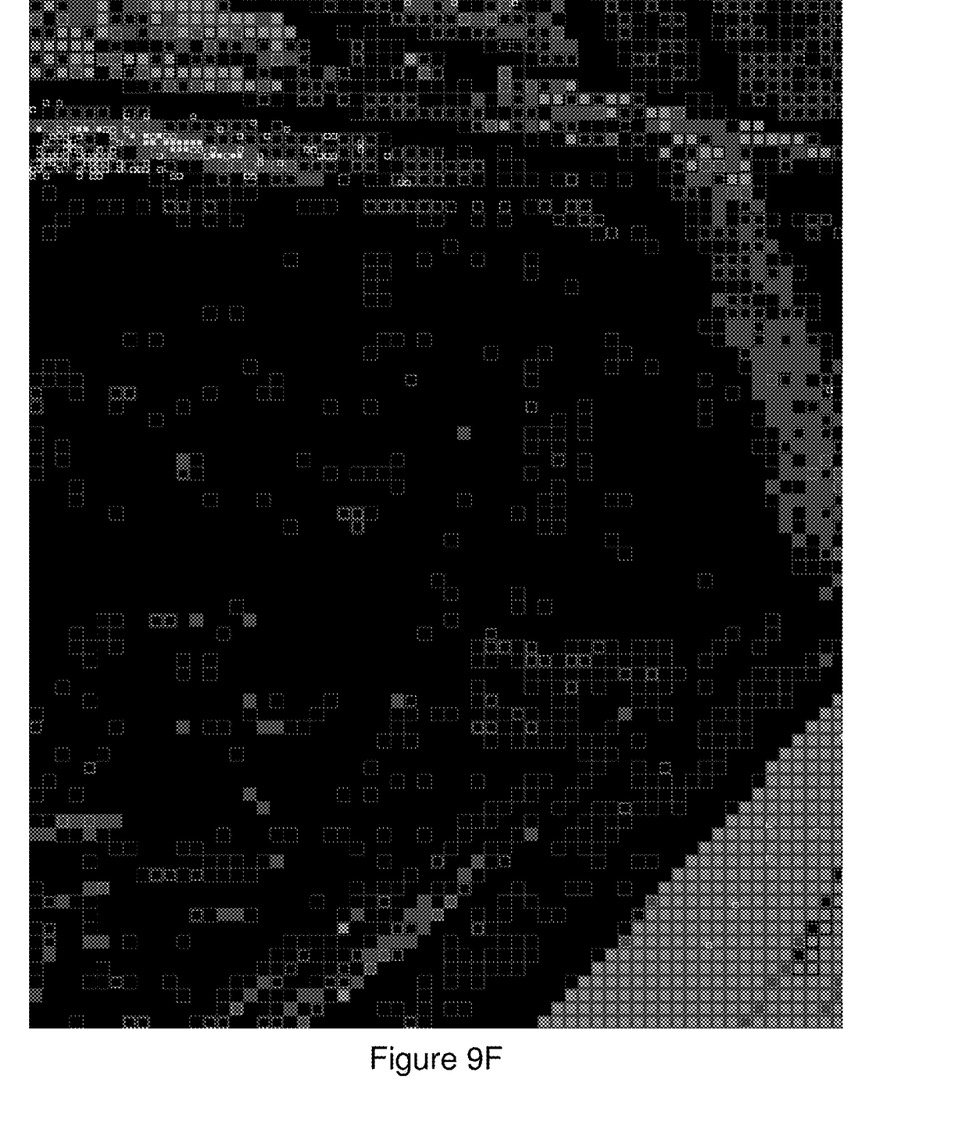

FIG. 9C is an illustration of processing the image blocks from the sea lion photo to determine which blocks are similar, while FIG. 9F is an illustration of processing the image blocks from the Las Vegas photo to determine which blocks are similar. FIGS. 9C and 9F illustrate similarity calculations within both chrominance channels and the luminance channel. Again, black areas are unique, gray shaded blocks are distinguished by which chrominance matrix is similar to another block. Blocks with just a border have a small number of similar blocks, while blocks which are filled in have a high number of similar blocks (more than 20 in this example). Certain gray shaded rectangles indicate blocks with similar luminance. Since JPEG images include higher resolution luminance data than chrominance data, there is a lower chance of duplication and/or similarity when the luminance of the blocks is compared.

Those of skill in the art will recognize that the method and system described above may be extended for use in a wide variety of situations on a wide variety of different file types. Further, a wide variety of different additional methods may be incorporated into the method and system described above, including the following:

The method may be used to operate a storage system that catches JPEG files when they are written to the storage system, or shortly after they are written to the storage system, and analyzes the JPEG images and stores them more efficiently.

JPEG images are stored in such a way that the last step of creating the JPEG data stream reduces the data in the JPEG into a high entropy data stream, thus eliminating the capability for further compression. The method "hydrates" that encoded data stream back to the raw coefficient matrices that represent the image signal and identify both individual blocks and patterns of blocks with identical or similar coefficient matrices and then store a hash key or fingerprint (a predictable unique identifier) that references this set of data being substituted.

In a network movement scenario, such as uploading a JPEG from a mobile device to a cloud service, one may build a list of candidate hash keys on the mobile device, ask the cloud service which data items already exist on the cloud service, and then upload only the new data blocks and a "recipe" for creating the other redundant data blocks.

A method to garbage collect old, no-longer-used coefficient data when files have been removed from the data set by marking reference counters on each coefficient matrix or pattern may be included.

The method may be extended into a general algorithm for doing this on any kind of graphical data, not just JPEG.

The method may also be extended to include a general approach for any discrete cosine transform or any other Fourier transform-based lossy compression for storing, building general patterns for coefficients on these transforms. These could be applied to lossy video compression and lossy audio compression techniques.

The method may also be extended by a technique of recompressing JPEG images into lower quality JPEGs as a way to quickly search for nearly-identical coefficient matrices in the higher quality JPEGs. By forcing data out of the JPEG coefficients in the lower quality image, one may increase the probability of duplicate matrices and thus search the space of candidates faster.

In some embodiments, the transformation operators may be bundled into bigger groupings with the ability to play them back. This allows for a reduction in metadata overhead.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for reducing data size of digital images comprising:
    receiving a Joint Photographic Experts Group (JPEG) encoded image;
    performing an entropy decode on the image;
    generating a fingerprint for each JPEG coefficient block;
    processing the fingerprint to determine the identity of any duplicate JPEG coefficient blocks;
        wherein the duplicate JPEG coefficient blocks are comprised of JPEG coefficient blocks within a defined variation factor of other JPEG coefficient blocks;
    generating metadata identifying the duplicate JPEG coefficient blocks;
    compressing non-duplicate JPEG coefficient blocks; and
    transferring the metadata, and the non-duplicate JPEG coefficient blocks to a remote system.

2. An apparatus comprising:
    a processing system;
    one or more non-transitory computer readable storage media having program instructions stored thereon that, when executed by the processing system, direct the processing system to:
    receive a Joint Photographic Experts Group (JPEG) encoded image;
    perform an entropy decode on the image;
    generate a fingerprint for each JPEG coefficient block;
    process the fingerprint to determine the identity of any duplicate JPEG coefficient blocks;
        wherein the duplicate JPEG coefficient blocks are comprised of JPEG coefficient blocks within a defined variation factor of other JPEG coefficient blocks;
    generate metadata identifying the duplicate JPEG coefficient blocks;
    compress non-duplicate JPEG coefficient blocks; and
    transfer the metadata, and the non-duplicate JPEG coefficient blocks to a remote system.

3. One or more non-transitory computer-readable memory having computer-executable instructions embodied thereon that, when executed by at least one processor, cause at least one processor to perform acts comprising:
    receiving a Joint Photographic Experts Group (JPEG) encoded image;
    performing an entropy decode on the image;
    generating a fingerprint for each JPEG coefficient block;
    processing the fingerprint to determine the identity of any duplicate JPEG coefficient blocks;
        wherein the duplicate JPEG coefficient blocks are comprised of JPEG coefficient blocks within a defined variation factor of other JPEG coefficient blocks;
    generating metadata identifying the duplicate JPEG coefficient blocks;
    compressing non-duplicate JPEG coefficient blocks; and
    transferring the metadata, and the non-duplicate JPEG coefficient blocks to a remote system.

* * * * *